United States Patent [19]
Inatani

[11] Patent Number: 5,872,752
[45] Date of Patent: Feb. 16, 1999

[54] APPARATUS FOR RECORDING AND/OR REPRODUCING DISK-LIKE RECORDING MEDIUM

[75] Inventor: Akihisa Inatani, Kanagawa, Japan

[73] Assignee: Sony Corporation, Japan

[21] Appl. No.: 710,415

[22] Filed: Sep. 17, 1996

[30] Foreign Application Priority Data

Sep. 26, 1995 [JP] Japan ................................. 7-248040

[51] Int. Cl.[6] ................................................ G11B 17/22
[52] U.S. Cl. ............................................................ 369/37
[58] Field of Search ........................... 369/37, 75.2, 77.1; 360/98.01, 98.02

[56] References Cited

U.S. PATENT DOCUMENTS

| | | | |
|---|---|---|---|
| 5,193,079 | 3/1993 | Ko et al. ................................... | 369/37 |
| 5,293,362 | 3/1994 | Sakurai et al. ............................ | 369/37 |
| 5,422,869 | 6/1995 | Versleegers ............................... | 369/37 |

*Primary Examiner*—Allen T. Cao
*Attorney, Agent, or Firm*—Ronald P. Kananen

[57] ABSTRACT

A disk player capable of selectively reproducing a plurality of optical disks includes a rotary table, a reproducing mechanism, a supporting member and a drive mechanism. The rotary table includes a plurality of concave portions on which a plurality of disk-like recording mediums are set. The reproducing mechanism includes a disk rotation drive portion for rotating the disk and a head for reading out an information signal from the disk. The supporting member includes the reproducing mechanism. The supporting member is moved between an elevated position at which the disk is rotated by the disk rotation drive portion and in which an information is reproduced from the disk by the head and a lowered position at which the disk rotation drive portion is detached from the disk-like recording medium. The drive mechanism drives the rotary table and the supporting member. The drive mechanism includes a Geneva gear provided at the rotation center of the rotary table and a rotary drive portion for rotating the Geneva gear. The rotary drive portion includes an operation portion for moving the supporting member between the elevated position and the lowered position.

18 Claims, 8 Drawing Sheets

APPARATUS FOR RECORDING AND/OR REPRODUCING DISK-LIKE RECORDING MEDIUM

BACKGROUND

1. Field of the Invention

The present invention relates to an apparatus for recording and/or reproducing a disk-like recording medium. More particularly, the present invention relates to a disk-like recording medium recording and/or reproducing apparatus capable of recording and/or reproducing one of a plurality of disk-like recording mediums.

2. Background of the Invention

Disk players of the rotary table type are known for recording and/or reproducing an information signal on and/or from an information recording medium of an information recording disk such as an optical disk or a magneto-optical disk or the like. Such a disk player comprises a rotary table having a plurality of disk stocker portions provided on the same circumference to store information recording disks, a table drive mechanism for rotating the rotary table, a disk drive mechanism for chucking and rotating one of the information recording disks stored in a plurality of disk stocker portions on the rotary table, a pickup device disposed so as to oppose the information recording surface of the information recording disk rotated by the disk drive mechanism and which can be moved along the radius direction of the disk for writing and/or reading an information signal on the information recording surface, etc. U.S. Pat. No. 4,755,978, for example, discloses such disk player of rotary table type.

The table drive mechanism comprises a motor serving as a power source, a reduction gear train increasing a torque by reducing a rotational speed of the motor to thereby rotate the rotary table, a drive belt for coupling a drive pulley fixed to the rotary shaft of the motor and a driven pulley fixed to an input gear of the reduction gear train so as to transmit a power, etc. An output gear of the reduction gear train is meshed with a gear portion of the rotary table.

The disk drive mechanism comprises a disk table for chucking the information recording disk in cooperation with a chucking plate, a spindle motor for rotating the disk table, a supporting bracket for supporting the spindle motor, a motor and a reduction gear train for operating the supporting bracket such that the information recording disk is chucked and released from being chucked. The supporting bracket is supported to the disk player so as to become swingable or movable in parallel. The supporting bracket is swung or translated in parallel by a rotational force of the motor serving as a power source, whereby the information recording disk is chucked on the disk table or released from being chucked on the disk table.

However, in the disk player, the table drive mechanism and the disk drive mechanism have motors independently provided and the rotary table is rotated and the supporting bracket is swung or translated in parallel by these respective motors. Therefore, there should be provided two motors serving as drive sources. As a result, assemblies of the disk player are uneconomical. Moreover, the two kinds of motors must be controlled separately with the result that the disk player becomes complicated in arrangement.

SUMMARY OF THE INVENTION

It is, therefore, an object of the present invention to provide a recording and/or reproducing apparatus for a disk-shaped recording medium in which the above-mentioned problem can be solved.

According to the present invention, there is provided an apparatus for recording and/or reproducing a disk-like recording medium which includes a rotary table, a recording and/or reproducing mechanism, a supporting member and a drive mechanism. The rotary table includes a plurality of concave portions in which a plurality of disk-like recording mediums are placed. The recording and/or reproducing mechanism records and/or reproduces an information signal on and/or from the disk-like recording medium placed on the rotary table. The recording and/or reproducing mechanism includes a disk rotation drive portion for rotating the disk-like recording medium and a head for recording and/or reproducing the information signal on and from the disk-like recording medium. The recording and/or reproducing mechanism is attached to a supporting member. The supporting member is moved between the elevated position in which a disk is rotated by the disk rotation and drive portion and in which the information signal is recorded and/or reproduced in and/or from the disk-like recording medium by the head and a lowered position in which the disk rotation and drive portion is spaced apart from the disk-like recording medium. The drive mechanism drives the rotary table and the supporting member. The drive mechanism drives a Geneva gear provided at the rotation center of the rotary table and a rotation drive member for rotating the Geneva gear. The rotation drive member includes an operation portion for moving the supporting member between the elevated position and the lowered position.

DESCRIPTION OF THE INVENTION

An apparatus for recording and/or reproducing a disk-like recording medium according to the present invention will hereinafter be described in detail with reference to the drawings. In the present invention, an apparatus for recording and/or reproducing a disk-like recording medium is applied to a disk, player using an optical disk such as a so-called compact disc, as a disk-like recording medium.

Figure 1:
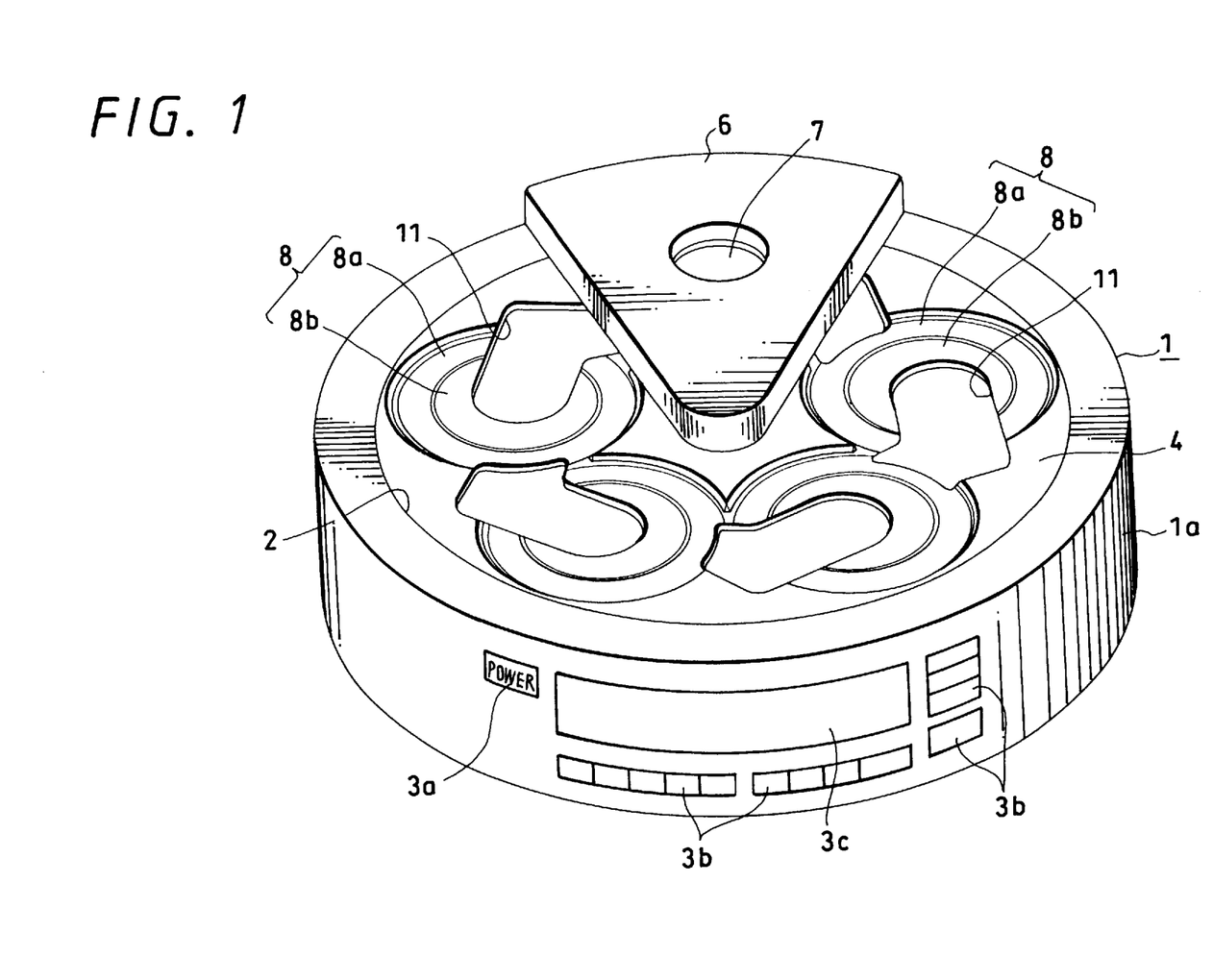
FIG. 1 is a perspective view showing an appearance of a disk player according to the present invention.
Figure 2:
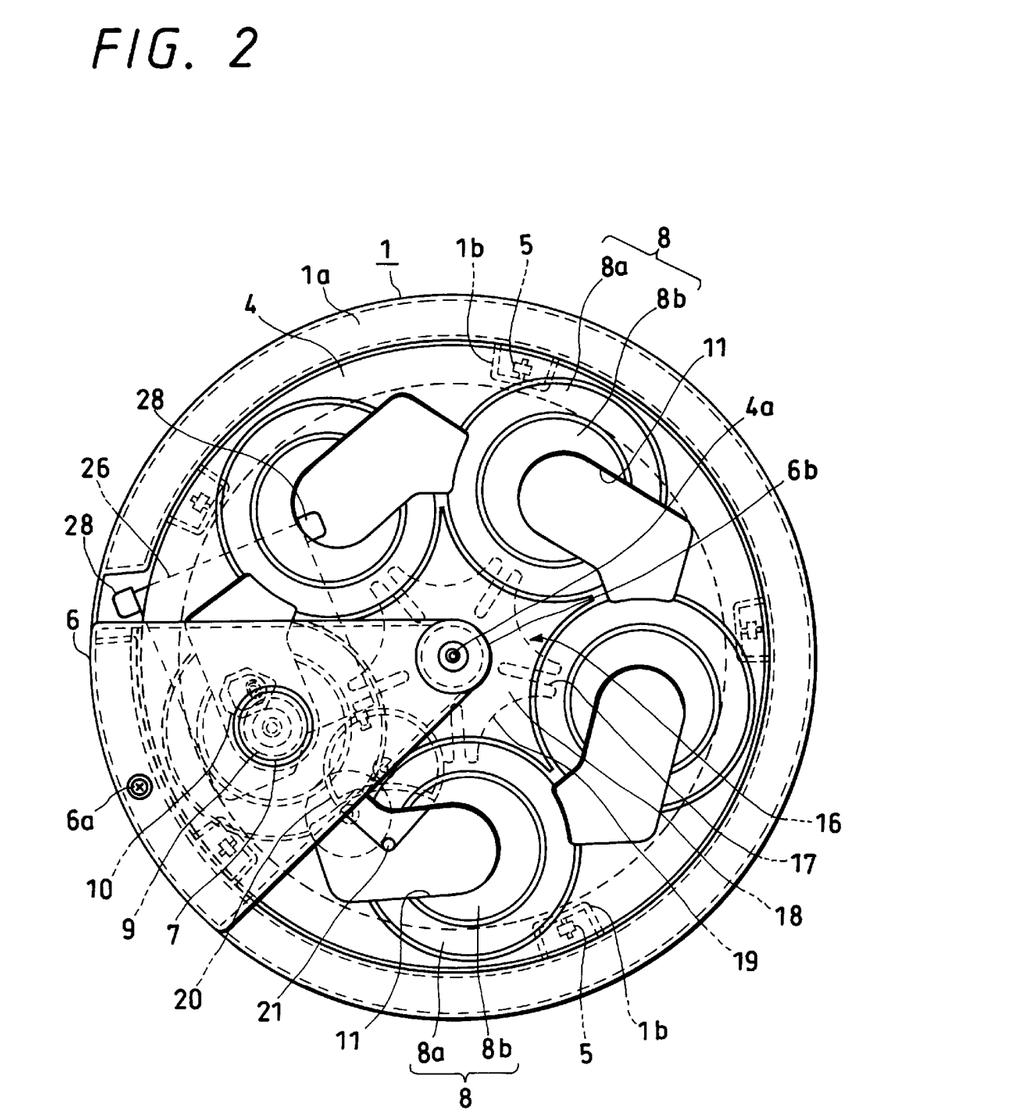
FIG. 2 is a plan view showing the disk player according to the present invention.
Figure 3:
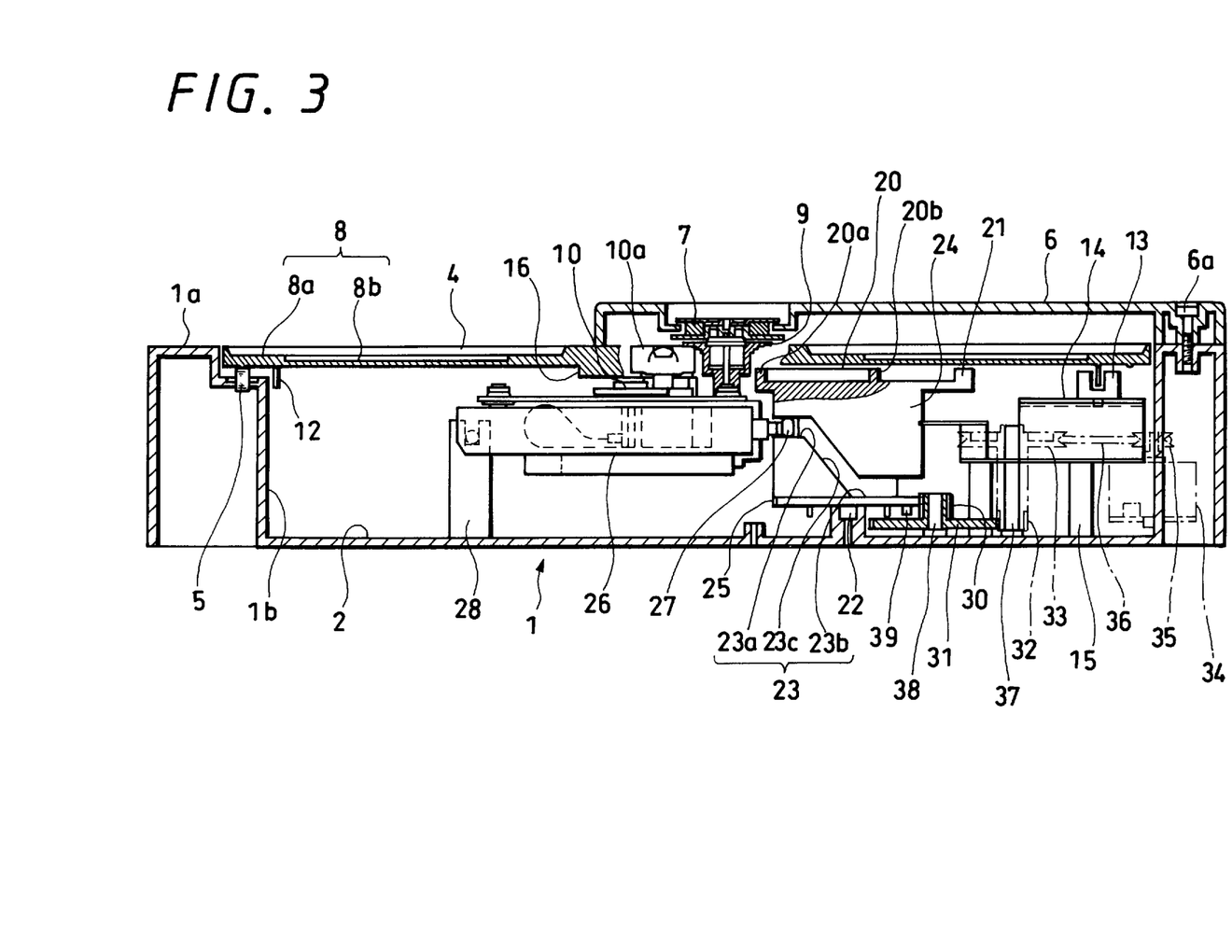
FIG. 3 is a longitudinal cross-sectional view showing the disk player according to the present invention.

As shown in FIGS. 1 through 3, the disk player according to the present invention includes a housing 1 serving as an apparatus body. The housing 1 comprises a saucer-shaped container having a circular depression portion 2 defined on the upper surface and an annular frame portion 1a having an annular space portion downwardly opened. The housing 1 includes on its front surface a power supply switch 3a for turning on and off an electric power supplied from an external power supply, a number of operation switches 3b such as a play switch, an address selection switch, a pause switch or a stop switch and a display portion 3c composed of a liquid-crystal display for displaying states of data entered by the operation switches 3a and a playback operation state such as play.

The opening side of the circular depression portion 2 of the housing 1 is closed by the rotary table 4. The rotary table 4 is rotatably supported by a plurality of supporting rollers 5 rotatably supported to the housing 1 from the underside. Each support roller 5 is pivotally supported on the upper portion of a roller support portion 1b protruded to the inside of the annular frame portion 1a of the housing 1. The supporting rollers 5 supported to the roller supporting portions 1b are disposed at an equal spacing in the circumferential direction of the annular frame portion 1a.

A base end of an arm bracket 6 is detachably attached to an upper surface of a part of the annular frame portion 1a of the housing 1 by a fixing screw 6a. The tip end of the arm bracket 6 is extended toward the center of the circular depression portion 2. A chucking plate 7 is pivotally supported to the intermediate portion of the arm bracket 6 and a bearing portion 6b is provided at the tip end of the arm bracket 6. A shaft portion 4a which becomes a rotation center of the rotary table 4 is pivotally supported to the bearing portion 6b of the arm bracket 6, whereby the rotary table 4 can be rotated relative to the housing 1.

The rotary table 4 is formed of a disk-shaped thin plate which can be loosely fitted into the opening side of the recess portion of the housing 1. A plurality of (five disk stocker portions in this embodiment) disk stocker portions 8 are provided on the upper surface of the rotary table 4 along the same circumference about the shaft portion 4a at an equal spacing. Each disk stocker portion 8 includes a large-diameter concave portion 8a and a small-diameter concave portion 8b concentrically formed so as to store therein or place thereon a 12-cm optical audio disk as a large-diameter optical disk and an 8-cm optical audio disk as a small-diameter optical disk. Specifically, the small-diameter concave portion 8b is formed by further reducing the depth of the center portion of the large-diameter concave portion 8a toward the lower surface side of the rotary table 4. Accordingly, any one of the 12-cm optical disk and the 8-cm optical disk can be loaded into and stored in each disk stocker portion 8 in such a manner that a signal reading surface of the optical disk is opposed to an optical pickup device which will be described later on.

Each disk stocker portion 8 includes a recess portion 11 through which a disk table 9 is opposed to the central portion of an optical disk D properly positioned in the large-diameter concave portion 8a or the small-diameter concave portion 8b and through which an objective lens portion 10a of an optical pickup device 10 is opposed to an information signal reading surface of the optical disk D. Each recess portion 11 is extended from the center of the disk stocker portion 8 along one of tangential directions to the edge of adjacent disk stocker portion 8. The optical pickup device 10 is moved within the recess portion 11 in the radius direction of the optical disk D.

A position detection ring 12 (FIG. 3) which is continuous about the shaft portion 4a in the circumferential direction is provided on the lower surface of the rotary table 4. The position detection ring 12 is used to detect the rotation position of the rotary table 4. In the vicinity of each disk stocker portion 8 are provided slits for displaying an address number assigned to each disk stocker portion 8. The slits of the position detection ring 12 are different in pitch to express predetermined addresses, thereby specifying the position of the disk stocker portions 8. In this embodiment, address numbers from address 1 to address 5 are provided in accordance with the disk stocker portions 8 by five kinds of slits with different pitches.

A photosensor 13 is disposed within the circular depression portion 2 of the housing 1 in association with the position detection ring 12. The photosensor 13 comprises a light-emitting element and a light-receiving element and attached to a mount plate 14 so as to hold the position detection ring 12 with the light-emitting element and the light-receiving element. The mount plate 14 is fixed to a support pole 15 erected within the circular depression portion 2. The photosensor 13 outputs a detected signal of high level when it detects the slit of the position detection ring 12.

The detected signal from the photosensor 13 is supplied to a control apparatus (not shown) and an address of the disk stocker portion 8 is judged through a predetermined computing processing by a computing processing apparatus. Thus, the five disk stocker portions 8 are specified by the slits of the position detection ring 12. The control apparatus includes a CPU (central processing unit), a RAM (random-access memory) or a ROM (read-only memory), etc. The control apparatus executes a predetermined computing processing based on an operation signal entered by the operation switches 3b and the detected signal from the photosensor 13. The control apparatus outputs a control signal based on a computed result to a drive motor 34, which will be described later on, to thereby chuck the optical disk D to the rotary table 4 or to execute play or the like.

Figure 5:
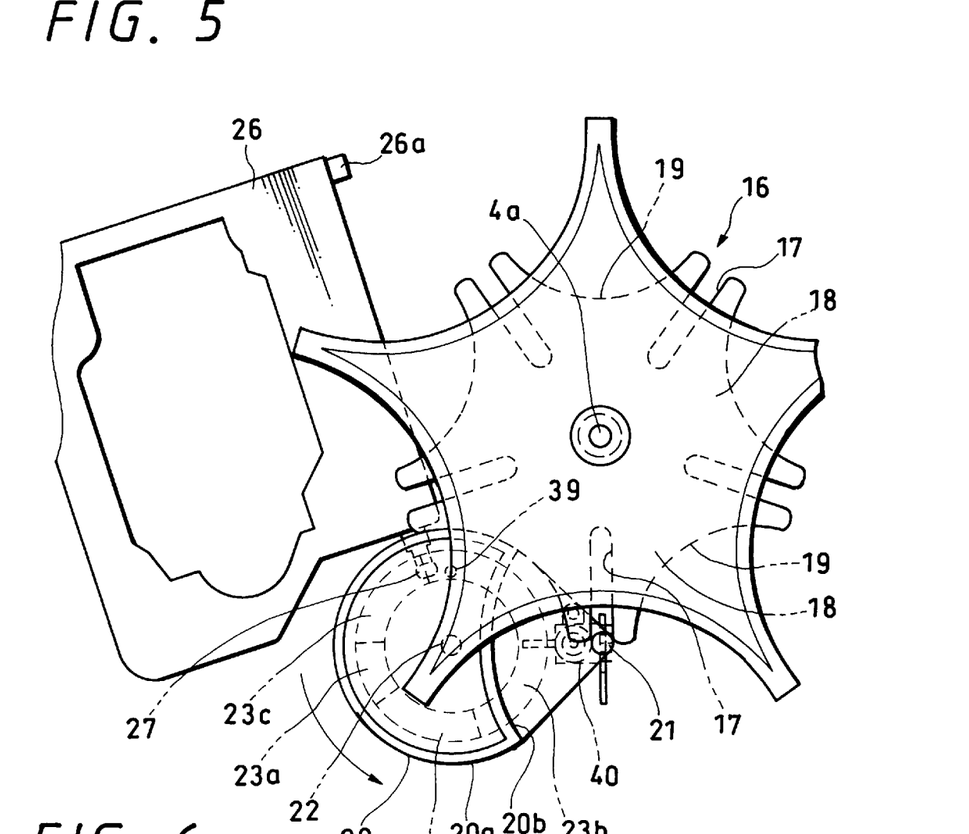
FIG. 5 is a plan view used to explain operation of the disk player according to the present invention and illustrating a manner before an optical disk is chucked to the rotary table.

On the central lower surface of the rotary table 4 is integrally formed a Geneva gear 16, which is one constituent of a Maltese cross mechanism (Geneva-stop mechanism), about the shaft portion 4a. The Geneva gear 16 gives an intermittent action five times per revolution. The Geneva gear 16 includes five cam grooves 17 radially extended in the radius direction and which are formed at an equal angular distance and five dovetail-shaped portions 18 formed among these cam grooves 17. On the outer peripheral surface of each dovetail-shaped portion 18 is formed an arcuate recess portion 19 with which an outer peripheral surface of a cylindrical portion 20a of a driver 20, which is the other constituent of the Geneva-stop mechanism, slidably comes in contact.

The driver 20 includes a cam pin 21 slidably inserted into the cam groove 17 of the Geneva gear 16, a cylindrical portion 20a whose outer peripheral surface comes in slidable contact with the arcuate concave portion 19 of the Geneva gear 16 and an arcuate concave recess portion 20b formed on the cam pin 21 side of the cylindrical portion 20a, and pivotally supported by an axle 22 erected on the housing 1. Accordingly, when the cam pin 21 of the driver 20 is not engaged with any of the cam grooves 17 of the Geneva gear 16, the outer peripheral surface of the cylindrical portion 20a comes in contact with the circumference surface of the arcuate concave portion 19, whereby the Geneva gear 16 is prevented from being rotated. When on the other hand the cam pin 21 of the driver 20 is engaged with any one of the cam grooves 17, the two tip end portions of the dovetail portion 18 are inserted into the concave recess portion 20b of the driver 20, whereby the Geneva gear 16 and the driver 20 can be rotated relatively.

Figure 6:
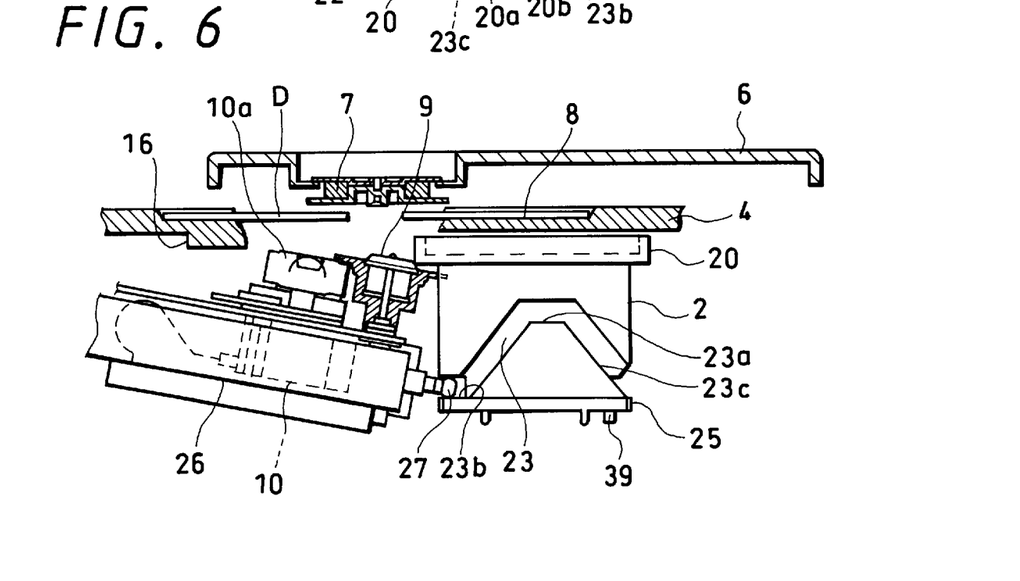
FIG. 6 is a cross-sectional view used to explain operation of the disk player according to the present invention and illustrating a manner before an optical disk is chucked to the rotary table.

As shown in FIGS. 3 and 6, a cylindrical cam member 24 with a cam groove 23 formed on its outer peripheral surface is integrally formed with the lower portion of the driver 20. Further, a drive gear 25 is attached to the lower portion of the cam member 24. As shown in FIG. 6, the cam groove 23 of the cam member 24 comprises an upper surface portion 23a horizontally extended with a small angular extent in the circumferential direction, a lower surface portion formed in the opposite direction of the upper surface portion 23 and which is horizontally extended over semi-circumference of the circumference direction and left and right inclined surface portions 23c, 23c communicating the upper and lower surface portions 23a, 23b. A cam pin 27, which is formed on the supporting bracket 26, is slidably engaged with the cam groove 23.

Figure 4:
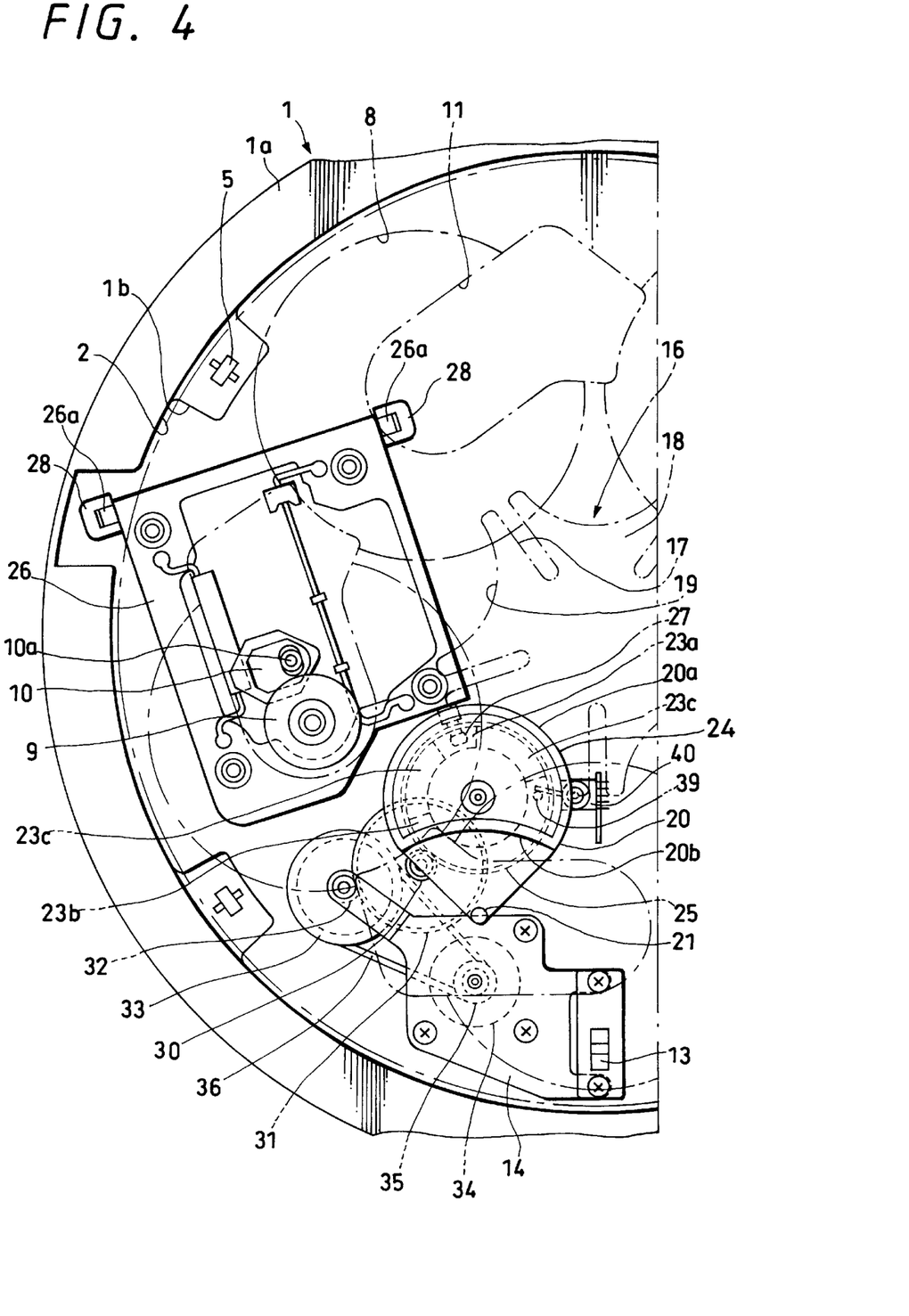
FIG. 4 is a fragmentary plan view of the disk player according to the present invention with a rotary table being removed.

As shown in FIG. 4, the supporting bracket 26 has the shaft portions 26a, 26a formed on both side portions opposite to the side to which the cam pin 27 is protruded. The shaft portions 26a, 26a of the supporting bracket 26 are rotatably supported by the bearing portions formed on the upper ends of the supporting shafts 28, 28 erected with the circular concave portion 2, whereby the supporting bracket 26 is made swingable with respect to the housing 1 in the upper and lower direction. Accordingly, when the cam pin 27 is guided by the cam groove 23 in the upper and lower direction, the supporting bracket 26 is swung about the axis of the left and right shaft portions 26a in the upper and lower direction.

Figure 10:
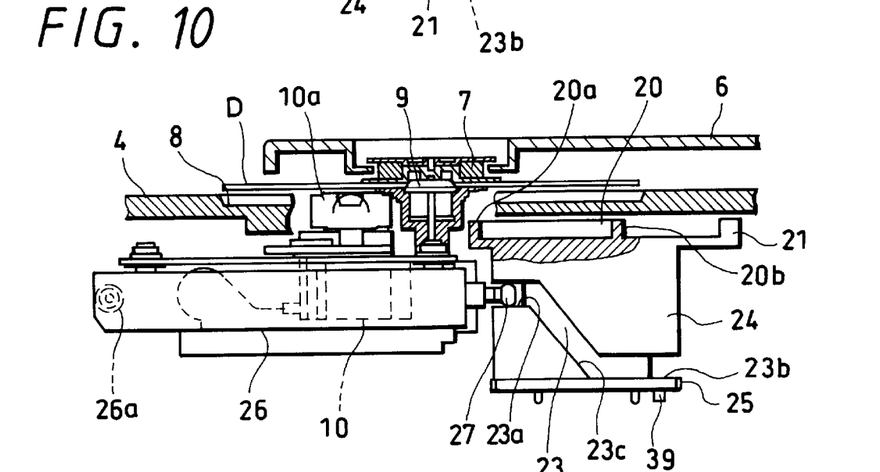
FIG. 10 is a plan view illustrative of a manner in which the optical disk was chucked to the rotary table.

A spindle motor (not shown) is attached to the supporting bracket 26 and a disk table 9 attached to the tip end of the rotary shaft is protruded in the upper rotary table 4 side. The disk table 9 is disposed at the position opposing to the chucking plate 7 supported to the arm bracket 6 in the upper and lower direction. When the cam pin 27 formed on the tip end of the supporting bracket 26 is located on the upper surface 23a of the cam groove 23, the supporting bracket 26 becomes substantially horizontal and the disk table 9 approaches the chucking plate 7 from the lower direction. As a consequence, as shown in FIG. 10, the chucking plate 7 is attracted to the disk table 9 by an attraction force of a magnet housed in the chucking plate 7, whereby the optical disk D can be chucked by the disk table 9 and the chucking plate 7.

As shown in FIG. 4, the optical pickup device 10 is attached to the supporting bracket 26. The objective lens portion 10a of the optical pickup device 10 is disposed in the lateral direction of the disk table 9. The optical pickup device 10 is moved within the recess portion 11 formed in each disk stocker portion 8 on the rotary table 4 in such a manner that it comes close to or away from the disk table 9 along the radius direction of the optical disk D. A laser beam emitted from the objective lens portion 10 of the optical pickup device 10 is irradiated on the information recording surface of the optical disk D to read out the information signal from the information recording surface, thereby music or the like is reproduced based on the thus read out signal.

The disk table 9 and the optical pickup device 10 are mounted on the supporting bracket 26. Due to action of the cam groove 23 with which the cam pin 27 fixed to the supporting bracket 26 is slidably engaged, the attitude of the supporting bracket 26 is changed in the upper and lower direction as shown in FIGS. 6 and 10. When the attitude of the supporting bracket 26 is changed, the optical disk D is chucked and released from being chucked.

As shown in FIG. 3, an output gear 30 is engaged with the drive gear 25 formed integrally with the cam member 24 and an input gear 32 is engaged with an intermediate gear 31 formed integrally with the output gear 30. A driven pulley 33 is integrally formed with the input gear 32. The driven pulley 33 and a drive pulley 35 fixed to the rotary shaft of the drive motor 34 are coupled by a transmission belt 36 so as to transmit power. The drive motor 34 is attached to the mount plate 14. The output gear 30 and the intermediate gear 31 are rotatably supported by a supporting shaft 37 erected on the housing 1, and the input gear 32 and the driven pulley 33 are rotatably supported by a supporting shaft 38 which is similarly erected on the housing 1.

As shown in FIGS. 3 and 4, there are provided a switch pin 39 and a cam rotation detection switch 40 which are used to detect a rotation of the cam member 24. While the switch pin 39 is provided on the lower portion of the cam member 24 so as to be protruded in the lower direction, the cam rotation detection switch 40 is fixed to the housing 1 side. The cam rotation detection switch 40 is disposed such that, under the chucking state in which the cam pin 27 is located over the upper surface portion 23a of the cam groove 23 and the supporting bracket 26 is pushed downwardly, the switch pin 39 energizes the cam rotation detection switch 40. The cam rotation detection switch 40 is used to prevent the drive motor 34 from being driven inadvertently when a reproducing operation is carried out after the optical disk D has been chucked on the rotary table 4. A detected signal from the cam rotation detection switch 40 is supplied to the aforementioned control apparatus thereby to control the operation of the drive motor 34.

The thus arranged disk player can select one desired optical disk D from a plurality of optical disks D and play the desired optical disk D as follows.

As shown in FIGS. 1 and 2, optical disks D are stored in proper disk stocker portion of five disk stocker portions 8 of the rotary table 4 rotatably supported with the circular concave portions 2 of the housing 1. In the case of this embodiment, inasmuch as there are provided the five disk stocker portions 8, the 12-cm optical disks may be stored in all of the large-diameter concave portions 8a of the five disk stocker portions 8 or the 8-cm optical disks may be stored in all of the small-diameter concave portions 8b. Moreover, any one of the 12-cm optical disk and the 8-cm optical disk may be stored in the proper disk stocker portion or the 12-cm optical disks and the 8-cm optical disks may be stored in more than two disk stocker portions 8 in a mixed state.

Then, after respective portions of the disk player are powered by turning on the power supply switch 3a, an address number of the disk stocker portion 8 in which a desired optical disk D is housed is inputted by the operation switch 3b in order to select the optical disk D which the user desires to play. Thus, the address number of the disk stocker portion 8 selected by the operation switch 3b, etc., is displayed on the display portion 3c. The photosensor 13 and the cam rotation detection switch 40 detect a rotation position of the rotary table 4 constantly or at a predetermined timing and detected signals also are inputted to the control apparatus.

As a consequence, the control apparatus executes a predetermined computing processing based on the selection signal entered by the operation switch 3b and the detected signals from the photosensor 13 and the cam rotation detection switch 40 and successively outputs predetermined control signals to thereby drive the drive motor 34, etc. The control apparatus determines based on the output signal from the photosensor 13 whether or not the selected disk stocker portion 8 in which the desired optical disk D is stored is located at the reproducing position which is above the optical pickup device 10. If the selected optical disk D is located at the reproducing position, then the control apparatus proceeds to the reproducing operation. If on the other hand the selected optical disk D is not located at the reproducing position, then the disk stocker portion 8 in which the selected optical disk D is stored is moved to the reproducing position by rotating the rotary table 4. Then, the control apparatus proceeds to the reproducing operation.

Assuming now that the selected optical disk D is located at the reproducing position, then the control apparatus outputs a control signal to the drive motor 34 thereby to drive the drive motor 34. A rotation force of the drive motor 34 is transmitted to the driven pulley 33 from its rotary shaft and the drive pulley 35 through the transmission belt 36, and further transmitted to the drive gear 25 from the input gear 32 through the intermediate gear 31 and the output gear 30.

In the initial state of operation, the disk player is placed in the state shown in FIGS. 5 and 6, in which while the cam pin 21 of the driver 20 is located at the entrance of one cam groove 21 of the Geneva gear 16, the cam pin 27 of the supporting bracket 26 is located on the lower surface portion 23b of the cam groove 23 of the cam member 24. In this state, as shown in FIG. 6, the swingable side of the supporting bracket 26 is in the lowered state so that the disk table 9 and the objective lens 10a of the optical pickup device 10 are projected to the lower direction from the recess portion 11 defined in the disk stocker portion 8 on the rotary table 4.

Figure 7:
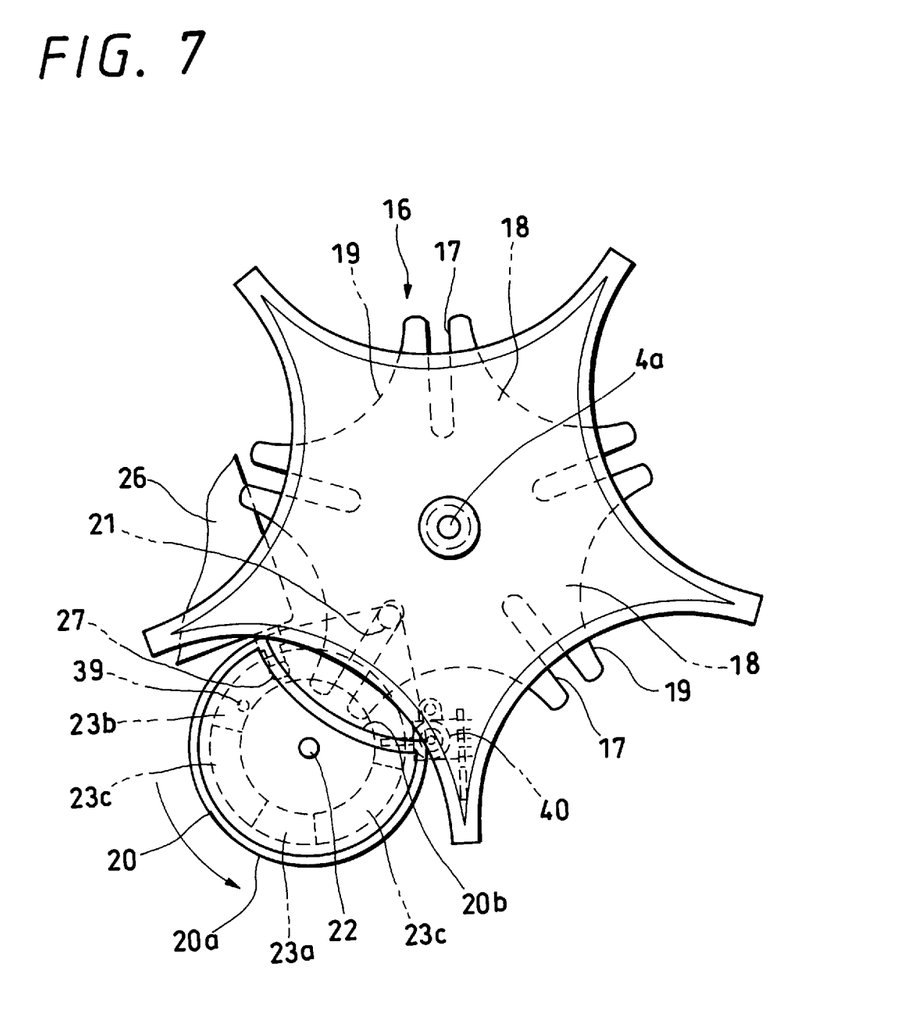
FIG. 7 is a plan view illustrative of a manner in which the rotary table is rotated a half pitch from the state shown in FIG. 6.

Under this state, when the driver 20 rotates in the counter-clockwise direction to cause the cam pin 21 to enter the cam groove 17 as shown in FIG. 5, the range in which the cylindrical portion 20a of the driver 20 and the arcuate concave portion 19 of the Geneva gear 16 contact with each other is narrowed sufficiently and the dovetail portion 18 restricted at its one side by the cylindrical portion 20a is released, thereby making it possible for one side of the dovetail member 18 to enter the recessed concave portion 20b of the driver 20. As a result, the Geneva gear 16 is rotated by a rotation force transmitted from the cam pin 21 to the dovetail portion 18, whereby the rotary table 4 integrally formed with the Geneva gear 16 is rotated in the clockwise direction. As shown in FIG. 7, when the cam pin 21 is fully entered into the inner part of the cam groove 17, the Geneva gear 16 is rotated half of one pitch. At that time, since the cam pin 27 is moved over the lower surface portion 23b of the cam groove 23 in the horizontal direction, the state that the supporting bracket 26 is inclined downwardly is maintained as it is.

Figure 8:
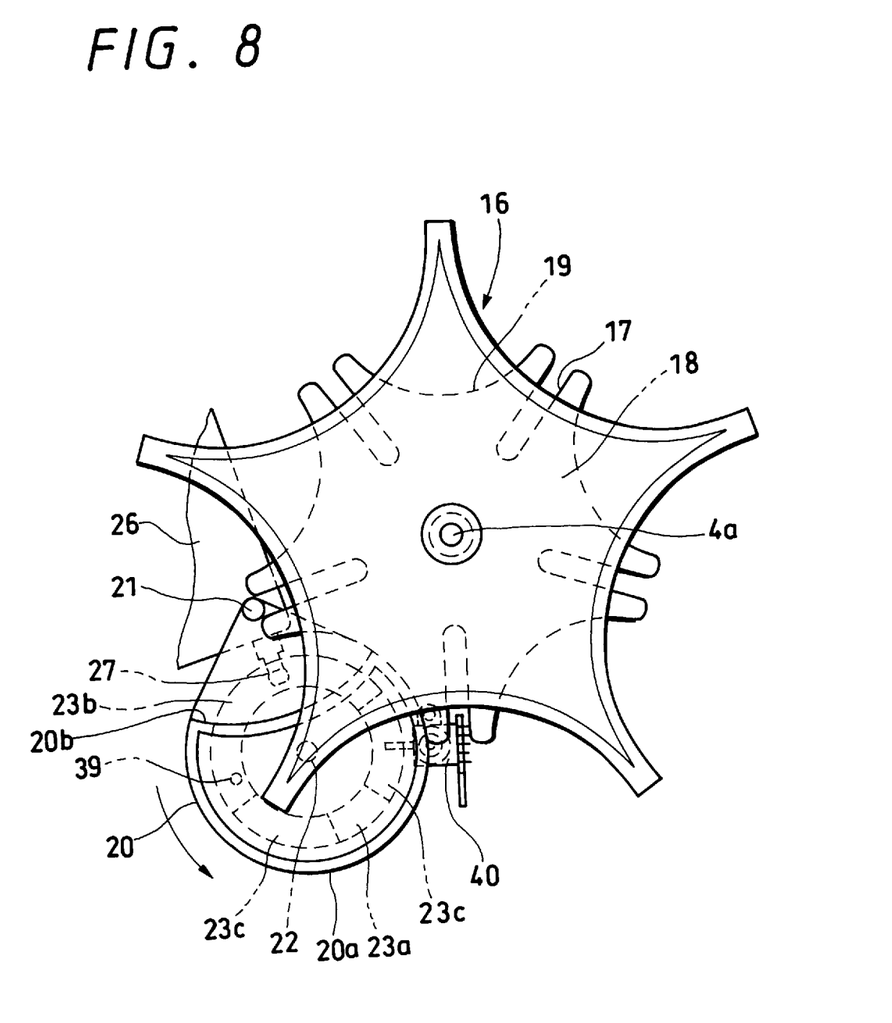
FIG. 8 is a plan view illustrative of a manner in which the rotary table is rotated one pitch from the state shown in FIG. 6.

When the moving direction of the cam pin 21 is changed by the rotation of the driver 20 toward the opening side of the cam groove 17 and the cam pin 21 is returned to the opening end of the cam groove 17 as shown in FIG. 8, the Geneva gear 16 is further rotated half of one pitch, whereby the rotary table 4 is rotated totally one pitch in the clockwise direction. Even in this state, since the cam pin 27 is moved over the lower surface portion 23b of the cam groove 23 in the horizontal direction, the state that the supporting bracket 26 is inclined downwardly is maintained as it is. One pitch is referred to as "rotation amount of rotary table" obtained when other disk stocker portion adjacent to a certain disk stocker portion is opposed to the disk table 9 and the optical pickup device 10 by rotating the rotary table 4 after a certain disk stocker portion has been opposed to the disk table 9 and the optical pickup device 10.

Figure 9:
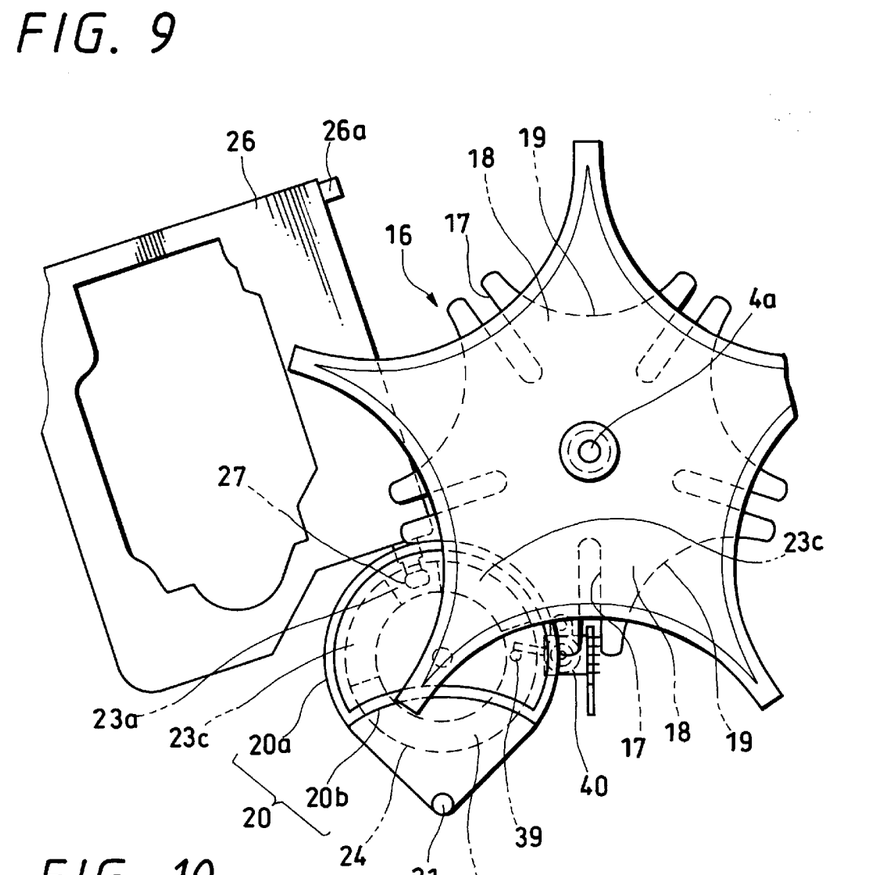
FIG. 9 is a plan view illustrative of a manner in which the optical disk was chucked to the rotary table.

Then, as shown in FIG. 9, when the cam pin 21 is extracted from the cam groove 17 as the driver 20 is further rotated in the counter-clockwise direction, the range in which the cylindrical portion 20a of the driver 20 and the arcuate concave portion 10 of the Geneva gear 16 contact with each other is sufficiently widened and the cylindrical portion 20a prevents the Geneva gear 16 from being rotated. Also, the detection pin 39 formed on the cam member 24 presses a movable contact member of the cam rotation detection switch 40 and the cam rotation detection switch 40 is turned on. Thus, the drive motor 34 is stopped and the rotation movement of the Geneva gear 16 is locked by the driver 20, whereby the rotary table 4 is fixed at the locked position.

At that time, the cam pin 27 of the supporting bracket 26 is moved along the inclined portion 23c of the cam groove 23 and reached to the upper surface portion 23a. As a result, the supporting bracket 26 is swung about the shaft portion 26a, whereby the disk table 9 is progressively elevated and approached to the optical disk D stored in the disk stocker portion 8 from the lower direction, resulting in the optical disk D being elevated from the bottom surface portion of the disk stocker portion 8. At the same time, as shown in FIG. 10, the chucking plate 7 is chucked to the disk table 9 by an attraction force of the magnet housed in the disk table 9 with the result that the optical disk D is chucked by the chucking plate 7 and the disk table 9, resulting in a preparation of playback of the optical disk D being completed.

Thereafter, the control apparatus outputs a playback control signal to drive the spindle motor (not shown) thereby to rotate the optical disk D set on the disk table 9. Moreover, the control apparatus drives a motor (not shown) for moving the optical pickup device 10 thereby to translate the optical pickup device 10 in the radius direction of the optical disk D. Thus, a laser beam is irradiated on the information recording surface of the optical disk D through the objective lens portion 10a to read an information signal recorded on the information recording surface. Then, the disk player plays back, for example music based on the information signal thus read out from the information recording surface of the optical disk D.

Then, after the playback operation is finished, the control apparatus outputs the control signal to the drive motor 34 thereby to further rotate the cam member 24 or the like in the counter-clockwise direction, whereby the cam pin 27 of the supporting bracket 26 is moved downwardly along the inclined portion 23c of the cam groove 23 to the lower surface portion 23b. As a result, the supporting bracket 26 is swung about the shaft portion 26b to progressively lower the disk table 9. Consequently the chucking plate 7 is detached from the disk table 9 against the attraction force of the magnet. The attitude of the supporting bracket 26 or the like is changed from the state shown in FIG. 10 to the state shown in FIG. 6 so that the disk table 9 and the objective lens portion 10a of the optical pickup device 10 are extracted to the lower direction from the recess portion 11 of the disk stocker portion 8. Thus the chucking of the optical disk D is released and the optical disk D is left within the disk stocker portion 8. Accordingly, the rotary table 4 becomes able to rotate next one pitch.

If on the other hand the selected optical disk D is not located at the reproducing position, then the detected signal from the cam rotation detection switch 40 is canceled before a reproducing operation is started after the chucking operation was finished. Then, the control apparatus outputs the control signal to the drive motor 34, whereby the chucking of the optical disk D is released and the rotary table 4 is rotated one pitch through an intermittent rotation operation done by the cam member 24 and the Geneva-stop mechanism. The control apparatus repeats the above-mentioned control operations until the selected disk stocker portion 8 in which the desired optical disk D is stored is moved to the reproducing position. It is needless to say that the chucking operation of the optical disk D may not be carried out but the Geneva-stop mechanism may be driven to rotate the rotary table 4 continuously until the disk stocker portion 8 in which the selected optical disk D is stored is opposed to the disk table 9 or the like.

As described above, according to the present invention, since the rotary table is provided with the Geneva gear which is intermittently rotated by the driver and the driver includes the cam member having the cam groove to guide the cam pin of the supporting bracket, two operations of rotation operation for intermittently rotating the rotary table and an elevating operation for elevating and lowering the supporting bracket having the disk table and the optical pickup device can be carried out by one drive motor. Therefore, the disk player can be simplified in arrangement and the number of assemblies of this disk player can be reduced. Moreover, the disk player can be easily controlled in operation and manufactured inexpensively.

While the present invention is described so far, the present invention is not limited to the above-mentioned embodiment. For example, while the five optical disks are stored on the plane of the rotary table 4 and one arbitrary optical disk is selected from the five optical disks and reproduced as described above, the number of optical disks that can be stored may be less than four or larger than 6. In this case, the numbers of the cam grooves 17 and the dovetail portions 18 of the Geneva gear 16 are changed in accordance with the number of stored disks. For example, if four optical disks are stored, then the Geneva gear 16 may include four cam grooves 17 and four dovetail portions 18. If six optical disks are stored, then the Geneva gear 16 may include six cam grooves 17 and six dovetail portions 18. While a preformatted optical disk D is used as the information recording disk as described above, the principle of the present invention is not limited thereto and a write once optical disk in which information can be written only once and a rewritable magneto-optical disk in which information can be written over and over may be used as the information recording disk.

While the present invention is applied to the disk player in which optical disks can be stored in the rotary table in the plane direction, the present invention is not limited thereto and may be applied to a reproducing apparatus, a recording apparatus and a recording and reproducing apparatus of a system in which optical disks can be arranged in the vertical direction. While the supporting bracket 26 is swung about the shaft portion 26a to change its attitude as described above, the present invention is not limited thereto and the supporting bracket 26 may be moved in parallel to the rotary table 4 to change its attitude.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for recording or reading an information signal recorded on disk-shaped recording media comprising:

a rotary table having a plurality of round concave portions for receiving a plurality of disk-shaped recording mediums;

a recording or reading mechanism for recording or reading an information signal on a disk-shaped recording medium on said rotary table, said recording or reading mechanism having a disk rotation driving portion for rotating said recording medium and a head for recording or reading an information signal on said recording medium;

a supporting member having said recording or reading mechanism disposed thereon, said supporting member being moved between an elevated position at which said recording medium is rotated by said disk rotation driving portion and in which said head reads or records said information signal and a lowered position at which said disk rotation driving portion is spaced apart from said recording medium; and a drive mechanism for driving said rotary table and said supporting member, said drive mechanism having a Geneva gear disposed at a rotation center of said rotary table and a rotary drive member for rotating said Geneva gear, said rotary drive member also having an operation portion for moving said supporting member between said elevated position and said lowered position;

wherein said Geneva gear is rotated by said rotary drive member after said rotary table is rotated relative to said recording or reading mechanism by an amount corresponding to a first distance between adjacent round concave portions and said supporting member is elevated and lowered by said operation portion; and further wherein an engagement protrusion is formed on any one of said rotary drive member and said Geneva gear, an engagement recess is formed on the other of said rotary drive member and said Geneva gear, and after said Geneva gear is rotated by said first distance, said engagement protrusion and said engagement recess are engaged with each other to restrict rotation of said Geneva gear.

2. An apparatus for recording and/or reproducing a disk-like recording medium as claimed in claim 1, in which said plurality of recess portions are disposed on an upper surface of said rotary table along a circumferential direction and said Geneva gear is integrally formed with said rotary table on a lower surface of said rotary table.

3. An apparatus as claimed in claim 1, wherein each of said round concave portions comprises a first round concave portion of a first diameter and a second round concave portion of a second diameter.

4. An apparatus as claimed in claim 3, wherein said first diameter is 12 cm and said second diameter is 8 cm.

5. An apparatus as claimed in claim 1, further comprising an annular housing in which said rotary table is rotatably supported.

6. An apparatus as claimed in claim 1, wherein said operation portion comprises a cam groove formed on said rotary drive member, said supporting member having an engagement portion engaged with said cam groove whereby said supporting member is elevated and lowered when said rotary drive member is rotated.

7. An apparatus for recording or reading an information signal on disk-shaped recording media comprising:

a rotary table having a plurality of round concave portions for receiving a plurality of disk-shaped recording mediums;

a recording or reading mechanism for recording or reading an information signal on a disk-shaped recording medium on said rotary table, said recording or reading mechanism having a disk rotation driving portion for rotating said recording medium and a head for recording or reading an information signal on said recording medium;

a supporting member having said recording or reading mechanism disposed thereon, said supporting member being moved between an elevated position at which said recording medium is rotated by said disk rotation driving portion and in which said head reads or records said information signal and a lowered position at which said disk rotation driving portion is spaced apart from said recording medium; and a drive mechanism for driving said rotary table and said supporting member, said drive mechanism having a Geneva gear disposed at a rotation center of said rotary table and a rotary drive member for rotating said Geneva gear, said rotary drive member also having an operation portion for moving said supporting member between said elevated position and said lowered position;

wherein said operation portion comprises a cam groove formed on said rotary drive member, said supporting member having an engagement portion engaged with said cam groove whereby said supporting member is elevated and lowered when said rotary drive member is rotated.

8. An apparatus as claimed in claim 7, in which said supporting member has a rotation supporting point at one end and said disk rotary drive member and said engagement portion at the other end.

9. An apparatus as claimed in claim 7, wherein each of said round concave portions comprises a first round concave portion of a first diameter and a second round concave portion of a second diameter.

10. An apparatus as claimed in claim 9, wherein said first diameter is 12 cm and said second diameter is 8 cm.

11. An apparatus as claimed in claim 7, wherein said drive mechanism comprises a drive motor, said rotary drive member mechanically connecting said drive motor and said Geneva gear.

12. An apparatus as claimed in claim 7, further comprising an annular housing in which said rotary table is rotatably supported.

13. An apparatus as claimed in claim 7, further comprising:

a position detection ring disposed on said rotary table; and a photosensor for detecting said position detection ring and determining therefrom which of said round concave portions is aligned with said recording or reading mechanism.

14. An apparatus for recording or reading an information signal on disk-shaped recording media comprising:

a rotary table having a plurality of round concave portions for receiving a plurality of disk-shaped recording mediums;

a recording or reading mechanism for recording or reading an information signal on a disk-shaped recording medium on said rotary table, said recording or reading mechanism having a disk rotation driving portion for rotating said recording medium and a head for recording or reading an information signal on said recording medium;

a supporting member having said recording or reading mechanism disposed thereon, said supporting member being moved between an elevated position at which said recording medium is rotated by said disk rotation driving portion and in which said head reads or records said information signal and a lowered position at which said disk rotation driving portion is spaced apart from said recording medium; and a drive mechanism for driving said rotary table and said supporting member;

wherein said drive mechanism comprises a cam groove formed on a rotating member, said supporting member having an engagement portion engaged with said cam groove whereby said supporting member is elevated and lowered when said rotating member of said drive mechanism is rotated; and wherein said drive mechanism comprises a drive motor and a Geneva gear disposed at a rotation center of said rotary table, said rotating member mechanically connecting said drive motor and said Geneva gear.

15. An apparatus as claimed in claim 14, wherein each of said round concave portions comprises a first round concave portion of a first diameter and a second round concave portion of a second diameter.

16. An apparatus as claimed in claim 15, wherein said first diameter is 12 cm and said second diameter is 8 cm.

17. An apparatus as claimed in claim 14, further comprising an annular housing in which said rotary table is rotatably supported.

18. An apparatus for recording or reading an information signal on disk-shaped recording media comprising:

a rotary table having a plurality of round concave portions for receiving a plurality of disk-shaped recording mediums;

a recording or reading mechanism for recording or reading an information signal on a disk-shaped recording medium on said rotary table, said recording or reading mechanism having a disk rotation driving portion for rotating said recording medium and a head for recording or reading an information signal on said recording medium;

a supporting member having said recording or reading mechanism disposed thereon, said supporting member being moved between an elevated position at which said recording medium is rotated by said disk rotation driving portion and in which said head reads or records said information signal and a lowered position at which said disk rotation driving portion is spaced apart from said recording medium;

a drive mechanism for driving said rotary table and said supporting member, wherein said drive mechanism comprises a cam groove formed on a rotating member, said supporting member having an engagement portion engaged with said cam groove whereby said supporting member is elevated and lowered when said rotating member of said drive mechanism is rotated;

a position detection ring disposed on said rotary table; and a photosensor for detecting said position detection ring and determining therefrom which of said round concave portions is aligned with said recording or reading mechanism.

* * * * *